United States Patent
Jeong et al.

(10) Patent No.: US 9,251,853 B2
(45) Date of Patent: Feb. 2, 2016

(54) METHOD, MEDIUM, AND SYSTEM GENERATING VIDEO ABSTRACT INFORMATION

(75) Inventors: Jin Guk Jeong, Suwon-si (KR); Young Su Moon, Seoul (KR); Ki Wan Eom, Seoul (KR); Ji Yeun Kim, Seoul (KR); Hyoung Gook Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1867 days.

(21) Appl. No.: 11/520,741

(22) Filed: Sep. 14, 2006

(65) Prior Publication Data

US 2007/0109446 A1    May 17, 2007

(30) Foreign Application Priority Data

Nov. 15, 2005 (KR) .................. 10-2005-0109309

(51) Int. Cl.
| | |
|---|---|
| *H04N 5/445* | (2011.01) |
| *G11B 27/28* | (2006.01) |
| *G06F 17/30* | (2006.01) |
| *G06K 9/00* | (2006.01) |
| *G11B 27/034* | (2006.01) |

(52) U.S. Cl.
CPC .......... *G11B 27/28* (2013.01); *G06F 17/30787* (2013.01); *G06F 17/30843* (2013.01); *G06K 9/00718* (2013.01); *G11B 27/034* (2013.01)

(58) Field of Classification Search
USPC .......................................................... 348/563
See application file for complete search history.

(56) References Cited

U.S. PATENT DOCUMENTS

| 6,714,909 | B1 * | 3/2004 | Gibbon et al. ................ 704/246 |
| 7,424,204 | B2 * | 9/2008 | Nakamura .................... 386/248 |
| 7,424,678 | B2 * | 9/2008 | Sezan et al. ................... 715/719 |
| 2002/0059584 | A1 * | 5/2002 | Ferman et al. .................. 725/34 |
| 2002/0126143 | A1 * | 9/2002 | Bae et al. ....................... 345/723 |
| 2002/0146168 | A1 * | 10/2002 | Lee et al. ....................... 382/165 |
| 2004/0017389 | A1 * | 1/2004 | Pan et al. ....................... 345/723 |
| 2004/0130567 | A1 * | 7/2004 | Ekin et al. ..................... 345/723 |

FOREIGN PATENT DOCUMENTS

| JP | 08-079674 | 3/1996 |
| JP | 9-198797 | 7/1997 |
| JP | 10-32776 | 2/1998 |
| JP | 10-145729 | 5/1998 |
| JP | 2001-351105 | 12/2001 |
| JP | 2002-44572 | 2/2002 |

(Continued)

OTHER PUBLICATIONS

Japanese Notice of Rejection issued on Sep. 1, 2009 on corresponding Japanese Application No. 2006-221615.

(Continued)

*Primary Examiner* — Chikaodili E Anyikire
(74) *Attorney, Agent, or Firm* — Staas & Halsey LLP

(57) ABSTRACT

A method, medium, and system generating a video abstract with high processing speeds, may include a detecting of an event candidate section from video data, based on audio information, a detecting of shot change information from the detected event candidate section, a detecting of final event sections from the detected event candidate section, based on the detected shot change information and visual information, and a generating of video abstract information by merging the extracted final event sections.

19 Claims, 22 Drawing Sheets

(56) References Cited

FOREIGN PATENT DOCUMENTS

| | | |
|---|---|---|
| JP | 2002-199332 | 7/2002 |
| JP | 2003-087728 | 3/2003 |
| JP | 2004-120553 | 4/2004 |

OTHER PUBLICATIONS

Japanese Patent Application issued on Jan. 27, 2009 in corresponding Japanese Patent Application 2006-221615.

* cited by examiner (910) (920)

(2211)

(2212)

(2213)

(2214)

METHOD, MEDIUM, AND SYSTEM GENERATING VIDEO ABSTRACT INFORMATION

CROSS-REFERENCE TO RELATED APPLICATIONS

This application claims the benefit of Korean Patent Application No. 10-2005-109309, filed on Nov. 15, 2005, in the Korean Intellectual Property Office, the disclosure of which is incorporated herein by reference.

BACKGROUND OF THE INVENTION

1. Field of the Invention

Embodiments of the present invention relate to a high-speed video abstract generation method, medium, and system, and more particularly, to a method, medium, and system in which an event candidate section is detected based on audio information, a final event section is detected from the detected event candidate section based on visual information, and video abstract information of the detected final event section is generated.

2. Description of the Related Art

As a conventional method of summarizing the content of a provided video, U.S. Patent Publication No. 2004/0017389 discusses summarizing such content by events within the video, e.g., using replay, a live event, and a setup event. However, in this conventional technique, visual information and audio information are individually processed to summarize video data, resulting in slow processing speeds.

Similarly, as a multimedia content indexing method, U.S. Pat. No. 6,714,909 discusses, with respect to the content of a provided news video, multi-modal information such as visual, audio, and text is used for generating news content information at a high level, such as abstract generation, speaker recognition, and subject recognition. However, again, this conventional multimedia content indexing technique also individually processes visual information and audio information to generate abstract information, resulting in slow processing speeds.

Thus, as described above, in conventional multi-modal information based summary techniques, since visual information and audio information are individually processed for multi-modal processing and an abstract is generated by integrating a result of the processing, the processing thereof takes a relatively long time. Namely, in conventional multi-modal information based summary techniques, and particularly in the case of summarizing based on visual information of HD video, for example, since two hours of HD images of visual information has approximately 15 GB to 18 GB of video data, a very large processing capacity is required for the processing of video information. Therefore, in these conventional techniques, the speed of detecting an event and generating an abstract becomes notably time consuming, which the present inventors have found to be an undesirable hindrance to the field.

Thus, the present inventors believe there is a need to improve processing speeds for generating video abstracts.

SUMMARY OF THE INVENTION

Accordingly, an aspect of an embodiment of the present invention provides a video abstract generation method, medium, and system in which an event candidate section is detected from video data by using audio information, and a final event section is then detected by processing visual information of the detected event candidate section, thereby generating video abstract information with increased processing speeds over the conventional techniques.

An aspect of an embodiment of the present invention also provides a video abstract generation method, medium, and system in which audio information and visual information are sequentially processed, thereby maintaining a level of coherence of video abstract information and improving processing speeds over the conventional techniques.

An aspect of an embodiment of the present invention further provides a video abstract generation method, medium, and system in which, in video data associated with a sports game, an audio event section is detected based on audio information such as cheers, a frequency of reaching a crescendo of an announcer, and/or a sound of a handclap, and a final event section is detected from the detected audio event section based on visual information, thereby generating video abstract information.

An aspect of an embodiment of the present invention further provides a video abstract generation method, medium, and system in which, in video data associated with news, an audio event section is detected based on audio information according to a silent section, and a final event section is detected from the detected audio event section based on visual information, thereby generating video abstract information.

An aspect of an embodiment of the present invention still further provides a video abstract generation method, medium, and system in which, in video data associated with a drama or a movie, an audio event section is detected based on audio information according to a music section, and a final event section is detected from the detected audio event section based on visual information, thereby generating video abstract information.

Additional aspects and/or advantages of the invention will be set forth in part in the description which follows and, in part, will be apparent from the description, or may be learned by practice of the invention.

To achieve the above and/or other aspects and advantages, embodiments of the present invention include a method of generating a video abstract, including detecting an event candidate section in video data based on corresponding audio information coincident with the video data, detecting shot change information from the detected event candidate section, detecting final event sections, from the detected event candidate section, based on the detected shot change information and visual information of the video data, and generating video abstract information by merging the detected final event sections.

The detecting of the event candidate section based on the audio information includes detecting an audio event section based on the audio information, and detecting at least one section adjacent to a segment detected as the audio event section as the event candidate section.

The at least one section includes a time-wise forward section before the segment and/or a time-wise back section after the segment.

The at least one section may include a time-wise forward section, having a predetermined time length, before the segment and a time-wise back section, having the predetermined time length, after the segment.

Here, when the video data is associated with a sport game, the audio event section may be determined based on one of cheers, a frequency of reaching a crescendo of an announcer, and a sound of a handclap.

When the video data is associated with news, the audio event section may be determined based on a silent section.

When the video data is associated with one of a drama and a movie, the audio event section may be determined based on one of a music section and an explosive sound.

Further, the detecting of the final event sections may include detecting an event reference shot from the event candidate section, detecting an event construction shot time-wise adjacent to the detected event reference shot, and determining a final event section based on the detected event construction shot.

In addition, when the video data is associated with a soccer game, the event reference shot may be a penalty area shot.

Here, the detecting of the event reference shot may include dividing a frame into N×N blocks and determining a first critical value with respect to a detected pixel value for each block, allocating 255 to a pixel value for each respective block when the respective detected pixel value is greater than the first critical value, allocating 0 to a pixel value for each respective block when the respective detected pixel value is not greater than the first critical value, substituting a position of a pixel whose allocated value is 255 through a predetermined equation and computing a position having a largest number of the pixels, determining whether the computed position is corresponding to an incline and a distance of a penalty line when the largest number of the pixels is greater than a second critical value, and detecting the event reference shot to be the penalty area shot when the computed position is corresponding to the incline and the distance of the penalty line.

The detecting of the event construction shot time-wise adjacent to the detected event reference shot may include determining whether, in a following shot after the penalty area shot, a number of close-up shots is greater than a predetermined number, and determining the close-up shots to be event construction shots when the number of close-up shots is greater than the predetermined number.

Here, when the video data is associated with the soccer game, in the determining of the final event section, the penalty area shot and the close-up shots may be determined to be part of the final event section.

In addition, when the video data is associated with news, the event reference shot may be an anchor shot.

The detecting of the event reference shot may include extracting an anchor model candidate shot, generating an anchor model from the extracted anchor model candidate shot, and determining the event reference shot to be the anchor shot by comparing the generated anchor model with a key frame.

When the video data is associated with a movie, the event reference shot may be a front close-up shot, and the event construction shot is an action shot.

Further, the detecting of the event reference shot may include detecting a face from a shot of the video data, measuring a distance between eyes of the detected face, and determining the event reference shot to be the front close-up shot when the measured distance between the eyes is greater than a critical value.

The detecting of the event candidate section in the video data may be based only on the corresponding audio information.

Further, the generating of the video abstract information may be based only on final event sections that are derived from the detected event candidate sections based on the corresponding audio information.

To achieve the above and/or other aspects and advantages, embodiments of the present invention include a medium including computer readable code to implement embodiments of the present invention.

To achieve the above and/or other aspects and advantages, embodiments of the present invention include a system, including an event candidate section detection unit to detect an event candidate section from video data based on corresponding audio information coincident with the video data, a shot change detection unit to detect shot change information from the detected event candidate section, a final event section detection unit to detect final event sections from the detected event candidate section, based on the detected shot change information and visual information of the video data, and a video abstract information generation unit to generate video abstract information by merging the detected final event sections.

Here, the event candidate section detection unit may detect an audio event section based on the audio information, and detect at least one section adjacent to a segment, detected as the audio event section, as the event candidate section.

The event candidate section may be the at least one section in at least one of time-wise before and after the segment detected as the audio event section.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
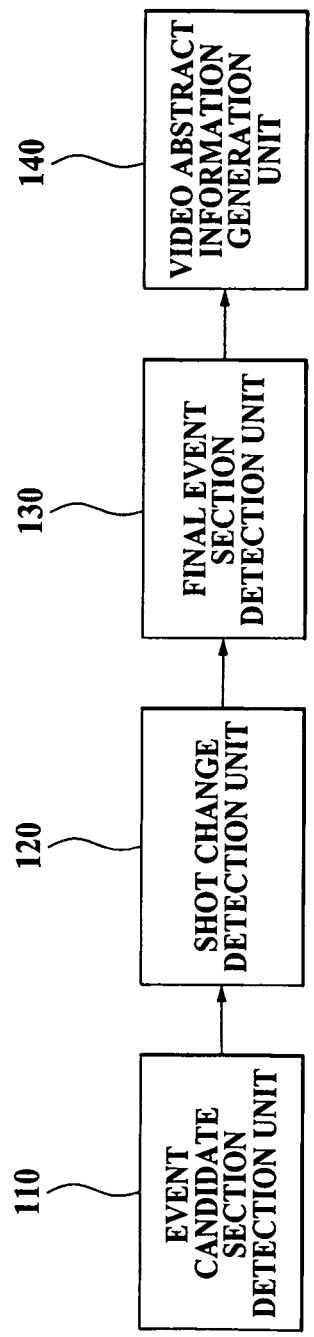
FIG. 1 illustrates a high-speed video abstract generation system, according to an embodiment of the present invention.

Reference will now be made in detail to the embodiments of the present invention, examples of which are illustrated in the accompanying drawings, wherein like reference numerals refer to the like elements throughout. Embodiments are described below to explain the present invention by referring to the figures.

FIG. 1 illustrates a high-speed video abstract generation system, according to an embodiment of the present invention. Referring to FIG. 1, the high-speed video abstract generation system may include an event candidate section detection unit 110, a shot change detection unit 120, a final event section detection unit 130, and a video abstract information generation unit 140, for example.

The event candidate section detection unit 110 detects an audio event based on audio information of video data and detects an event candidate section by using the detected audio event. The event candidate section is a section in which it may be easy to determine if an event occurs in the video data and may have a different audio event feature depending on the type of the video data.

When the video data is, for example, data associated with a sports game, the event candidate section detection unit 110 may detect the event candidate section by using audio events such as cheers, the frequency of reaching a crescendo of an announcer, and the sound of a handclap, for example, noting that additional and/or alternative audio events are not limited thereto.

Similarly, when the video data is, for example, data associated with news, the event candidate section detection unit 110 may detect the event candidate section by using an audio event such as a silent section of the news, for example, again noting that additional and/or alternative audio events are not limited thereto.

Still further, when the video data is, for example, data associated with a drama or a movie, the event candidate section detection unit 110 may detect the event candidate section by using audio events such as a background music section or a sound of explosion, for example, again noting that additional and/or alternative audio events are not limited thereto.

Here, the event candidate section detection unit 110 may detect the event candidate section by modeling the audio event based on a classifier such as a Support Vector Machine (SVM) or a Gaussian Mixture Model (GMM), only as an example.

Figure 4:
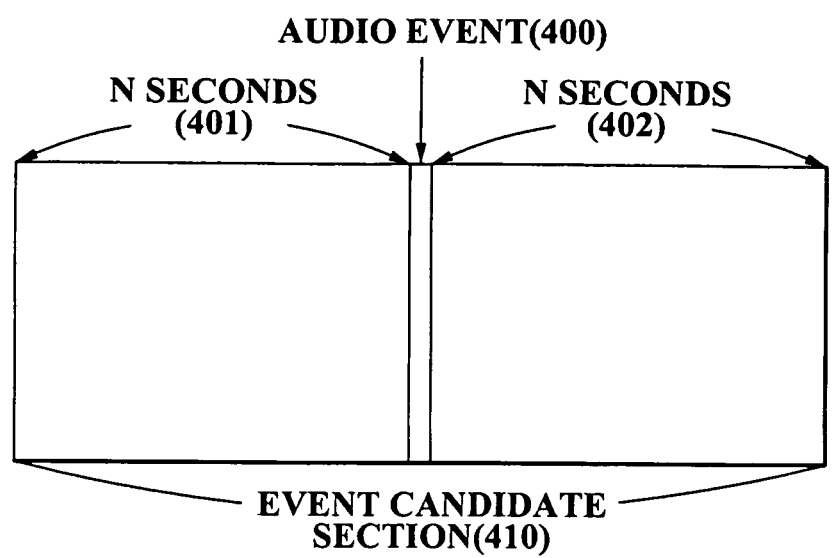
FIG. 4 illustrates an example of an audio event candidate section, according to an embodiment of the present invention.

As shown in FIG. 4, the event candidate section detection unit 110 may detect predetermined sections 401 and/or 402, before and/or after the audio event 400 section segment, as an event candidate section 410. Thus, the event candidate section 410 may be determined by reasoning that a section before and/or after a position where the audio event occurs may be an important scene.

Accordingly, the event candidate section detection unit 110 may detect a period of predetermined time before and/or after the audio event 400 section segment. The event candidate section may include, for example, a period of 10 seconds before the audio event 400 section, a period of 10 seconds after the audio event 400 section, or a period of 10 seconds before and after the audio event 400 section. Here, the use of 10 seconds, and the use of a same number of seconds before and after the event are merely used for illustration purposes, as alternate periods before and after are equally available. The choice of time before and/or after may also be based upon the available time period allotted to an eventual summary. In addition, another discriminator may be used other than a time window before and/or after the even may also be used.

Further, the shot change detection unit 120 may detect a shot change of the event candidate section in order to improve efficiency in processing visual information and determine a predetermined final event section per shot.

Thus, in an embodiment, the final event section detection unit 130 may detect the final event section from the event candidate section based on the detected shot information and the visual information.

Namely, the final event section detection unit 130 may detect a predetermined event reference shot from the event candidate section, may detect an event construction shot adjacent to the detected event reference shot, and may detect the final event section by using the detected event reference shot and the event construction shot, for example.

The video abstract information generation unit 140 may further generate video abstract information of the video data by merging the detected final event section.

Figure 2:
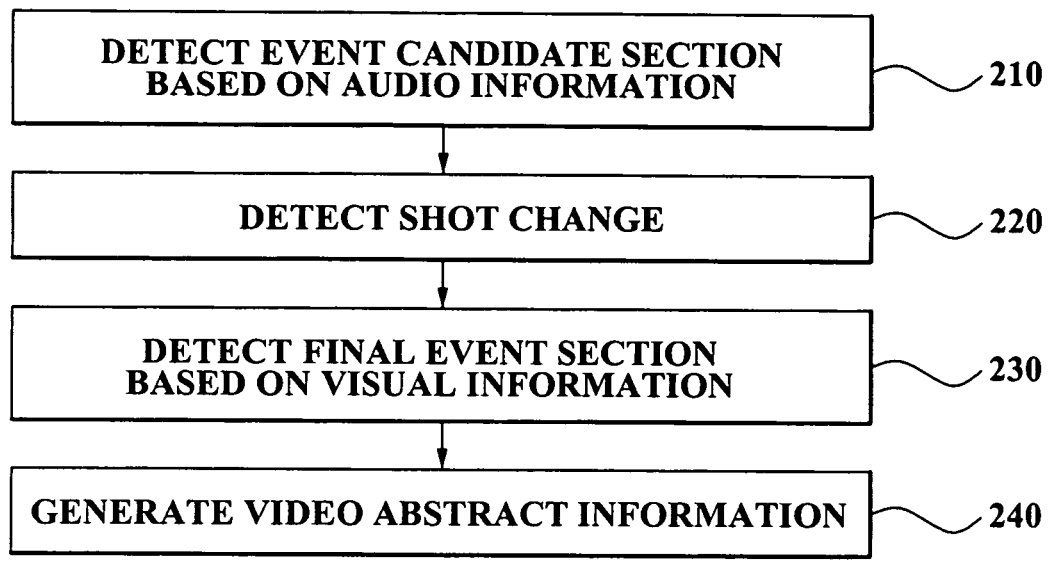
FIG. 2 illustrates a high-speed video abstract generation method, according to an embodiment of the present invention.

FIG. 2 illustrates a high-speed video abstract generation method, according to an embodiment of the present invention.

Figure 3:
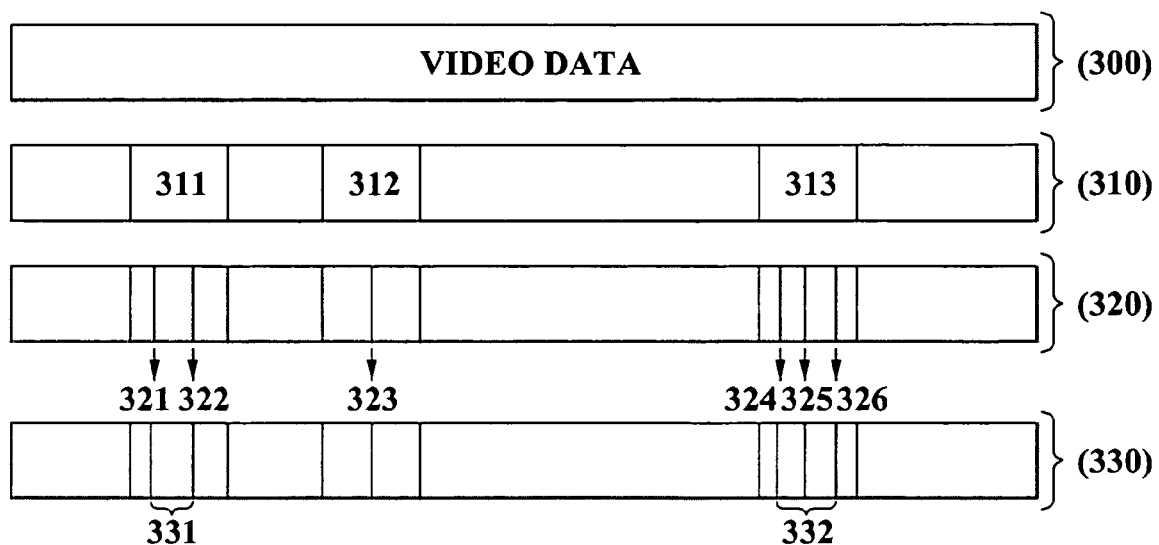
FIG. 3 illustrates an example of final event sections, according to an embodiment of the present invention.

Referring to FIG. 2, in operation 210, an audio event 400 may be detected based on audio information from the video, such as data 300 and event candidate sections 311, 312, and 313, of FIG. 3, based on the detected audio event.

When the video data 300 is associated with a sports game, the audio event section may be determined according to occurrences in the audio information of cheers, a frequency of reaching a crescendo of an announcer, and/or a sound of a handclap, as only an example.

Similarly, when the video data is associated with news, the audio event section may be determined according to a silent section of the news, as only an example.

When the video data is associated with a drama or a movie, the audio event section may be determined according to a music section and/or a sound of explosion, as only an example.

Namely, in operation 210, the audio event section may be detected based on the audio information and may further detect a predetermined section adjacent to the segment detected as the audio event section. As only an example, the event candidate section may be a predetermined period before or after the detected audio event. Further, the event candidate section may be, for example, as shown in FIG. 4, the period 401, N seconds before the audio event 400 and the period 402, N seconds after the audio event 400.

In operation 220, as an example, shot changes 321 to 326 may be detected from the detected event candidate section, as shown in FIG. 3.

In operation 230, final event sections 331 and 332 may be detected from the detected event candidate section based on the detected shot change information and visual information, for example.

Thereafter, in operation 240, video abstract information may be generated by merging any of the detected final event sections.

As described above, in a high-speed video abstract generation method according to an embodiment of the present invention, audio information and video information may be sequentially processed, thereby maintaining a level of coherence in comparison with conventional multi-modal methods and improving processing speeds.

Figure 5:
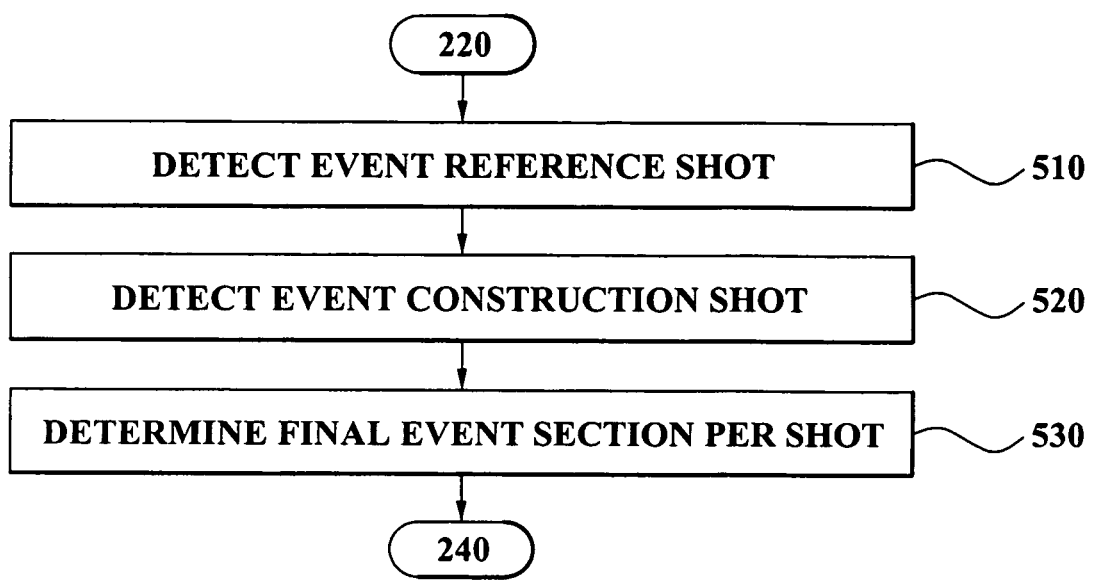
FIG. 5 illustrates a detecting of a final event section, according to an embodiment of the present invention.

FIG. 5 illustrates a detecting of a final event section, according to an embodiment of the present invention.

Referring to FIG. 5, in operation 510, a predetermined event reference shot may be detected from the event candidate section.

When video data is associated with a soccer game, for example, the event reference shot could be a penalty area shot, also as an example.

Similarly, when the video data is associated with news, for example, the event reference shot could be an anchor shot, again only as an example.

Further, when the video data is associated with a movie, for example, the event reference shot could be a front close-up shot, for example.

Here, alternative embodiments are equally available and embodiments of the present invention should not be limited to these described types of video data or shots.

In operation 520, an event construction shot may be detected adjacent to the detected event reference shot.

In such a high-speed video abstract generation method, when the video data is associated with a soccer game, in an example, if there are more than a predetermined number of close-up shots following the penalty area shot, and the close-up shots could be detected as the event construction shot. For example, when there are more than two close-up shots following the penalty area shot the close-up shot could be detected as the event construction shot.

As another example, when the video data is associated with a movie, the event construction shot may be an action shot.

In operation 530, a final event section may be determined per shot based on the detected event reference shot and the event construction shot.

Here, when the video data is associated with a soccer game, for example, the final event section could be determined based on the penalty area shot and the close-up shot, for example.

Figure 6:
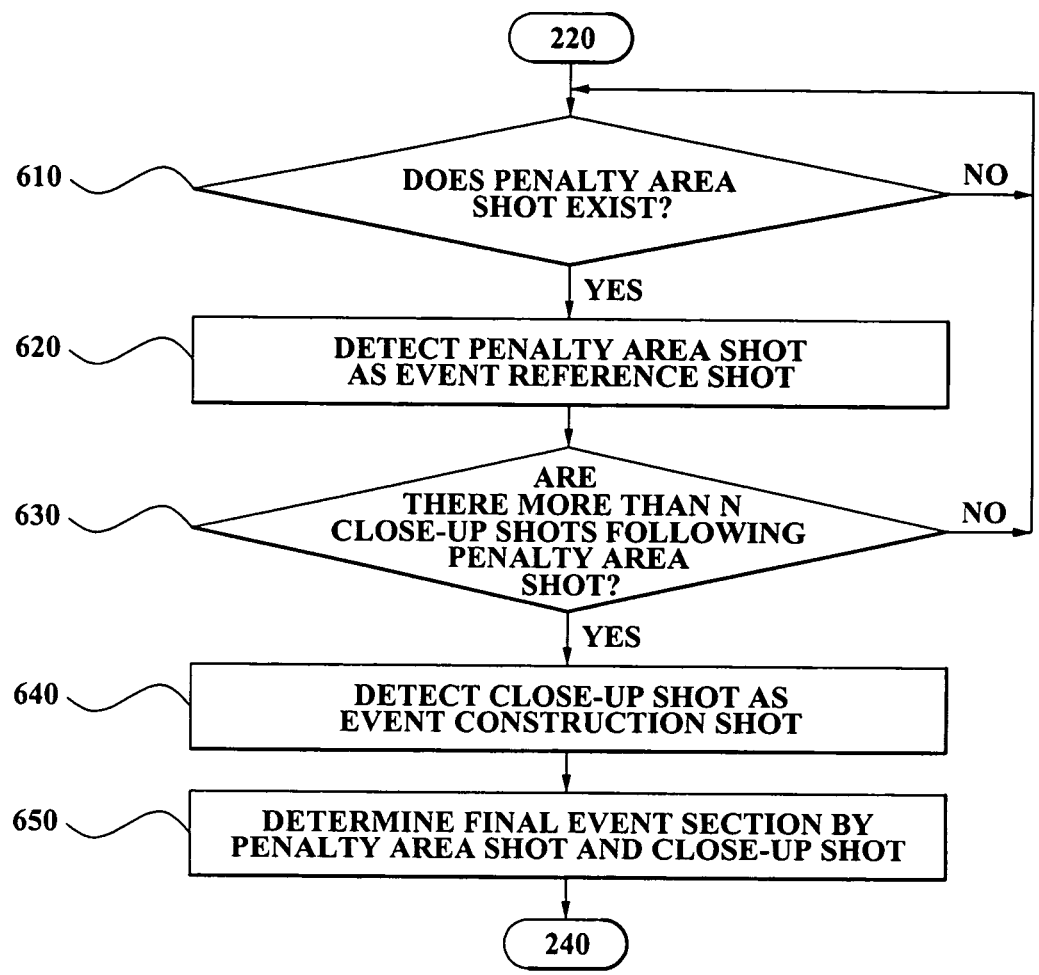
FIG. 6 illustrates a detecting of a final event section from a soccer game video, according to an embodiment of the present invention.

FIG. 6 illustrates a determining of a final event section from a soccer game video, according to an embodiment of the present invention.

Referring to FIG. 6, in operation 610, using the example of the soccer game, whether there is a penalty area shot in an event candidate section may be determined by using visual information. Here, the event candidate section may be determined based on audio information of the video data, as a predetermined period before and/or after a section in which an audio event occurs, such as cheers, a frequency of reaching a crescendo of an announcer, or a sound of a handclap, for example.

If there is a penalty area shot, in operation 620, the penalty area shot may be detected as an event reference shot.

In operation 630, whether there are more than a predetermined number of close-up shots, for example, following the penalty area shot may further be determined. The predetermined number may be, for example, two, though embodiments of the present invention are not limited thereto.

When there are more than the predetermined number of close-up shots, the close-up shot may be determined to be an event construction shot, in operation 640. For example, when there are more than two close-up shots, the close-up shot may be detected to be the event construction shot.

In operation 650, the final event section may be determined based on penalty area shot and the close-up shot, for example.

Figure 7:
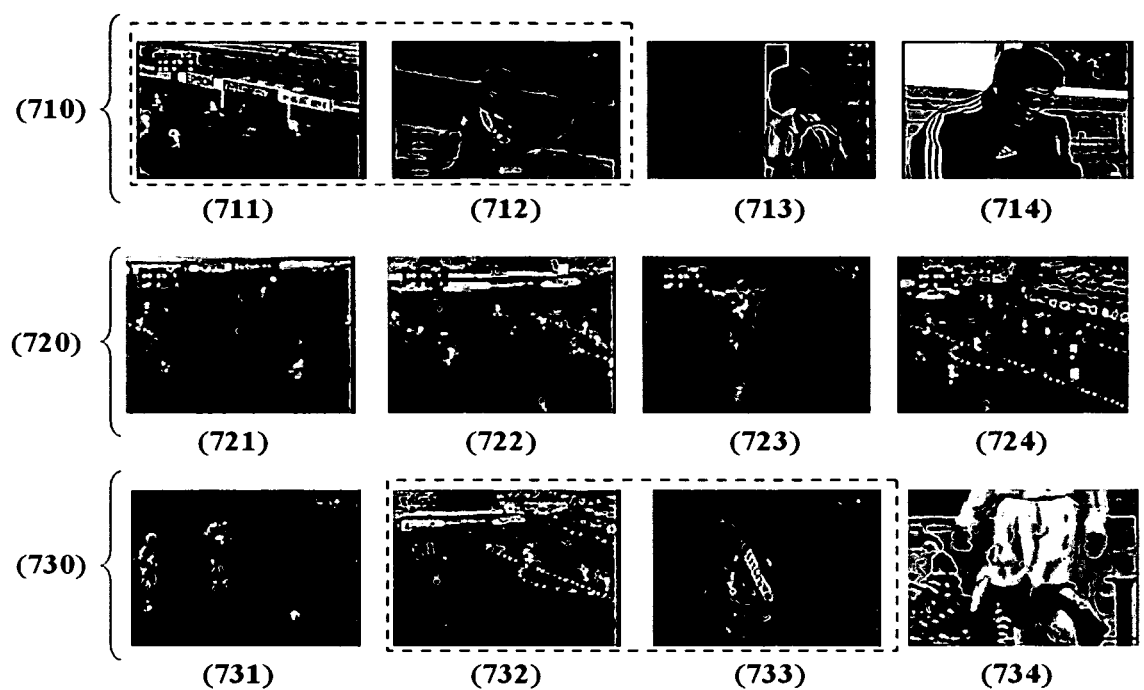
FIG. 7 illustrates an example of a detecting of a final event section from a soccer game video, according to an embodiment of the present invention.

FIG. 7 illustrates an example of a detecting of the final event section from such a soccer game video, according to an embodiment of the present invention.

Referring to FIG. 7, first video data 710 illustrates the case, for example, in which a goal event occurs, with a penalty area shot 711 and three following close-up shots 712 through 714. Here, as an example, the penalty area shot 711 and the close-up shot 712 may be determined to be the final event section. Accordingly, the first video data 710 may include appropriate video abstract information, indicating that a goal event occurs, and may be determined to be a final event section.

Second video data 720 includes shots 721-723 and a penalty area shot 724 but does not include any close-up shots following the penalty area shot 724. Accordingly, the second video data 720 may not be determined to be a final event section.

Third video data 730, for example, shows the case in which a shoot event occurs, with a penalty area shot 732 and two following close-up shots 733 and 734 after the penalty area shot 732, as well as shot 731. Thus, the penalty area shot 732 and the close-up shot 733 may be determined to be the final event section. Accordingly, the third video data 730 may include appropriate video abstract information, indicating that a shoot event occurs, and may be determined to be a final event section.

Figure 8:
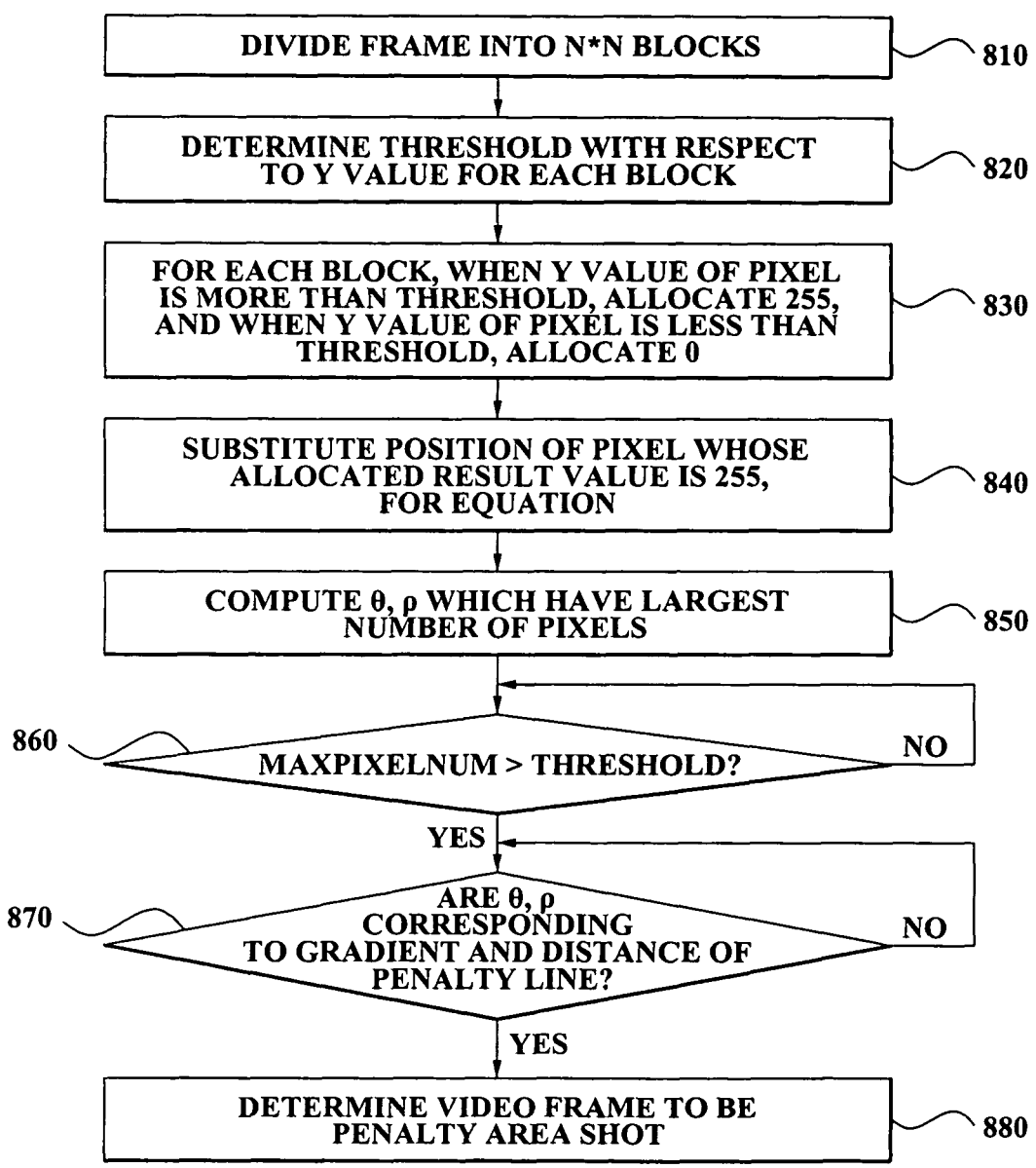
FIG. 8 illustrates a detecting of a penalty area shot from a soccer game video, according to an embodiment of the present invention.

FIG. 8 illustrating a detecting of a penalty area shot from such a soccer game video, according to an embodiment of the present invention.

Referring to FIG. 8, in operation 810, a video frame may be divided into N×N blocks. For example, the video frame may be divided into 16×16 blocks.

In operation 820, a threshold of a Y value of pixels for each block may be determined, according to the following Equation 1.

Equation 1:

$$T = \frac{\left(\sum_{i=0}^{N \times N} Y(i)\right)}{N \times N} \times a$$

Here, α indicates a brightness threshold constant.

In operation 830, the value 255 may be allocated when the Y value of the pixel in each block is more than a threshold and allocates 0 when the Y value of the pixel is less than the threshold. Namely, the video pixel data may be binarized into 255 or 0.

In operation 840, a position (x and y) of a pixel whose allocated result value is 255 may be substituted for by the following Equation 2.

$$x \cos \theta + y \sin \theta = \rho \qquad \text{Equation 2:}$$

In operation 850, θ and ρ having a largest number of pixels MaxPixelNum may be calculated. A Hough Transformation may then be performed via operations 840 and 850.

In operation 860, whether the largest number of pixels MaxPixelNum is greater than a predetermined threshold may be determined.

When the largest number of pixels MaxPixelNum is greater than the threshold, whether the computed θ and ρ are corresponding to a gradient and a distance of a penalty line may be determined, in operation 870.

When the computed θ and ρ are determined to correspond to a gradient and distance of a penalty line, the video frame may be determined to be a penalty area shot, in operation 880.

Figure 9:
FIG. 9 illustrates an example of a binarizing of a penalty area shot of a soccer game video, according to an embodiment of the present invention.
Figure 9:
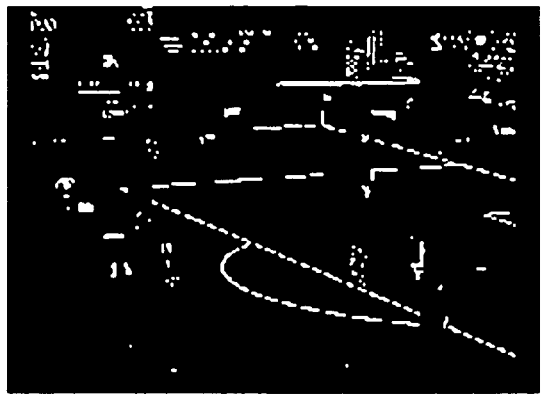

FIG. 9 illustrates an example of a binarizing of a penalty area shot of such a soccer game video, according to an embodiment of the present invention.

Referring to FIG. 9, the illustrated first image 910 is an original image of the penalty area shot, and the second image 920 is an image of a binarized first image 910, e.g., via operations 810 through 830.

Figure 10:
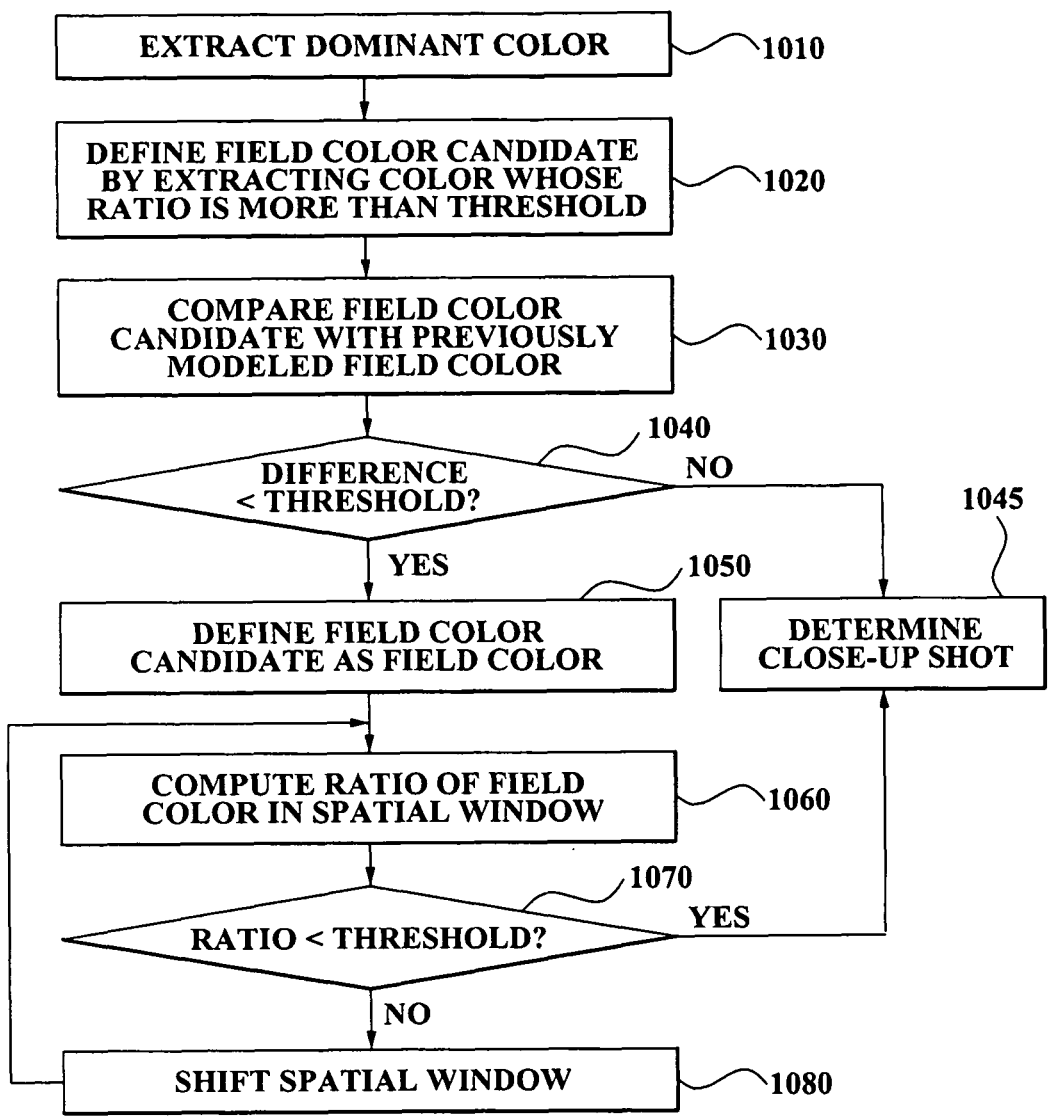
FIG. 10 illustrates a detecting of a close-up shot from a soccer game video, according to an embodiment of the present invention.

FIG. 10 illustrates a detecting of a close-up shot from a soccer game video, according to an embodiment of the present invention.

Referring to FIG. 10, in operation 1010, a dominant color may be extracted from a predetermined shot. Since a part of video frames is used, the dominate color of the soccer playing field may be extracted in each frame.

In operation 1020, a color whose ratio to the extracted dominant color is greater than a predetermined threshold may be extracted and the extracted dominant color may be defined as a color candidate, e.g., a soccer playing field color candidate.

In operation 1030, the example defined field color candidate may be compared with a previously modeled field color, for example.

In operation 1040, whether the difference between the field color candidate and the modeled field color is less than a predetermined threshold may then be determined.

When such a difference is not less than the threshold, the shot may be determined to be the close-up shot, in operation 1045.

When such a difference is less than the threshold, the field color candidate may be defined to be the field color, in operation 1050.

In operation 1060, a ratio of the defined field color in a predetermined spatial window may be computed. Further, in operation 1070, whether the computed ratio is less than a predetermined threshold may be determined.

When the computed ratio is less than the threshold, as in operation 1045, the shot may be determined to be the close-up shot.

Figure 11:
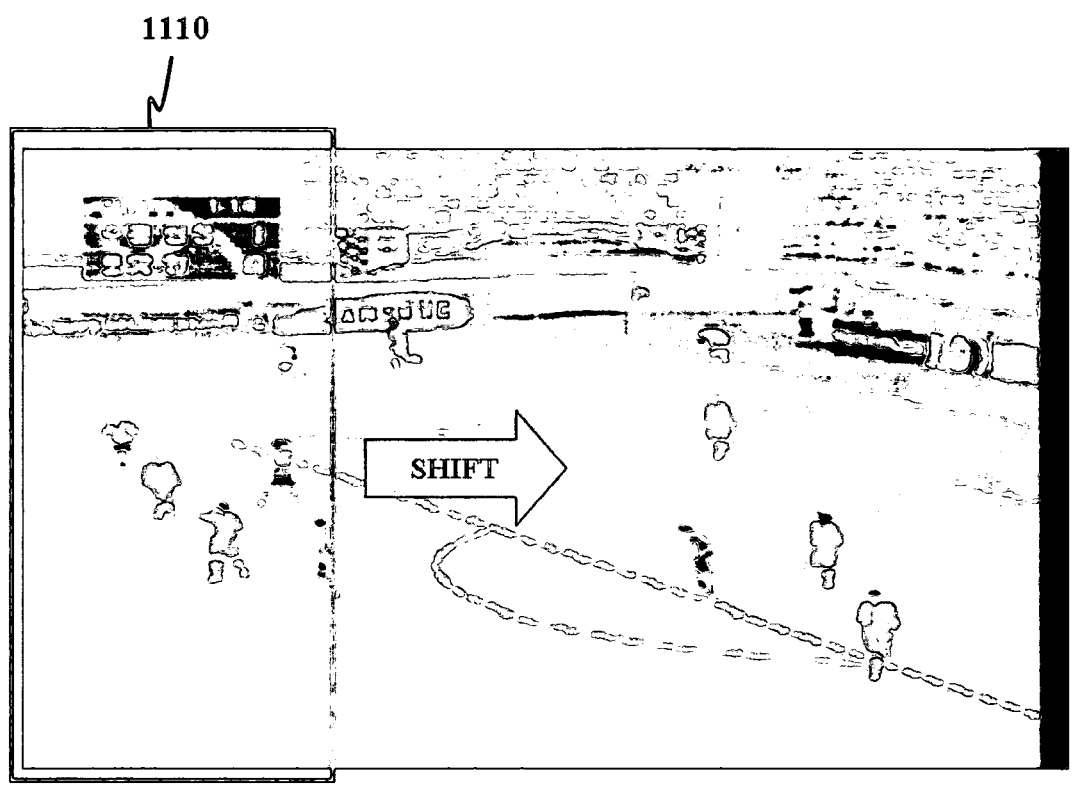
FIG. 11 illustrates a shift of a spatial window in a soccer game video, according to an embodiment of the present invention.

When the computed ratio is not less than the threshold, the process may return to operation 1060 after shifting a spatial window 1110, in operation 1080, as illustrated in FIG. 11.

As described above, in a high-speed video abstract generation method, according to an embodiment of the present invention, an audio event section may be detected from video data associated with a sports game, for example, based on audio information such as cheers, a frequency of reaching a crescendo of an announcer, and a sound of a handclap, for example, and may detect a final event section of the detected audio event section, based on visual information, thereby generating video abstract information.

Figure 12:
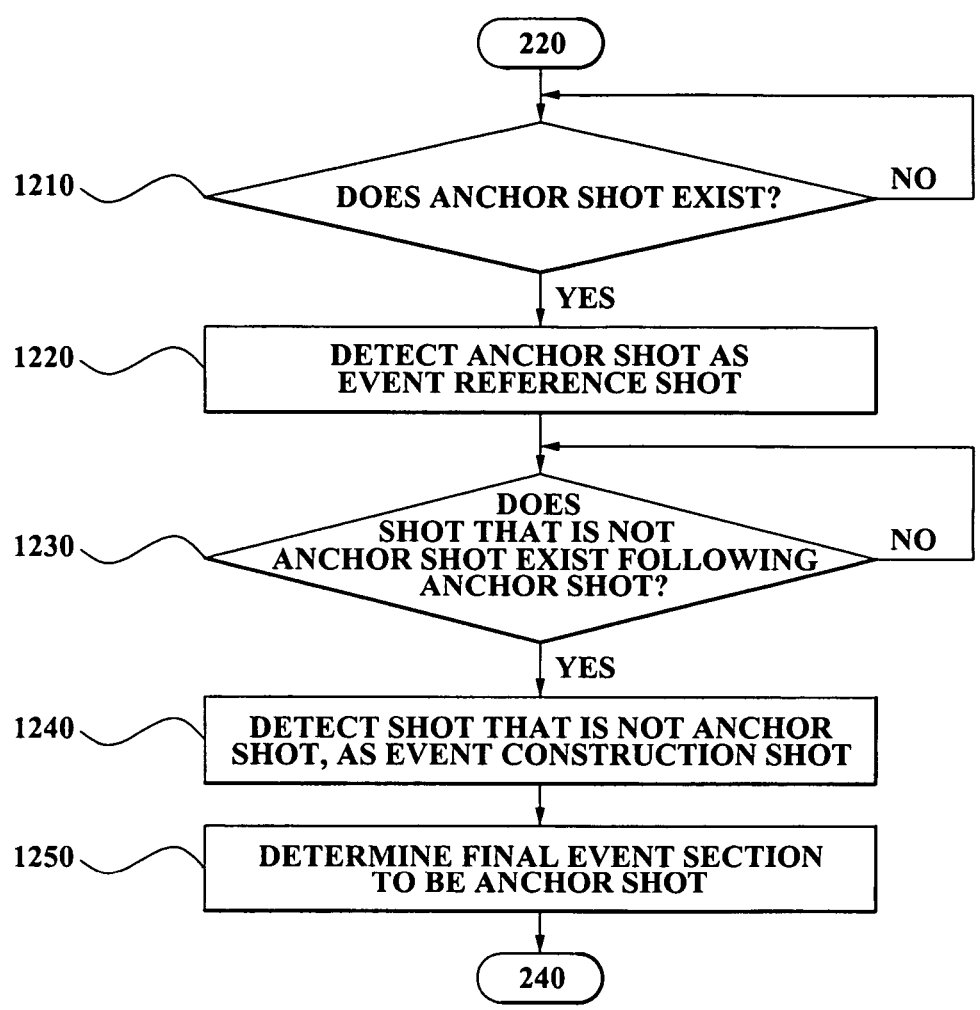
FIG. 12 illustrates a determining of a final event section in a news video, according to an embodiment of the present invention.

FIG. 12 illustrating a determining of a final event section in a news video, according to an embodiment of the present invention.

Referring to FIG. 12, in operation 1210, when video data is associated with news, whether there is an anchor shot in the video data may be determined.

In this example, when the video data is associated with news, an event candidate section may detected according to a silent section of the news, a shot change occurring in the detected event candidate section may be detected, and whether there is an anchor shot from the video data in a position of the detected shot change may be determined.

When there is an anchor shot, in operation 1220, the anchor shot may be determined to be an event reference shot.

In operation 1230, whether there is a shot that is not an anchor shot following the anchor shot may further be determined.

Here, when the following shot is not an anchor shot, the following shot may be determined to be an event construction shot.

In operation 1250, a final event section may be determined to be the anchor shot.

Figure 13:
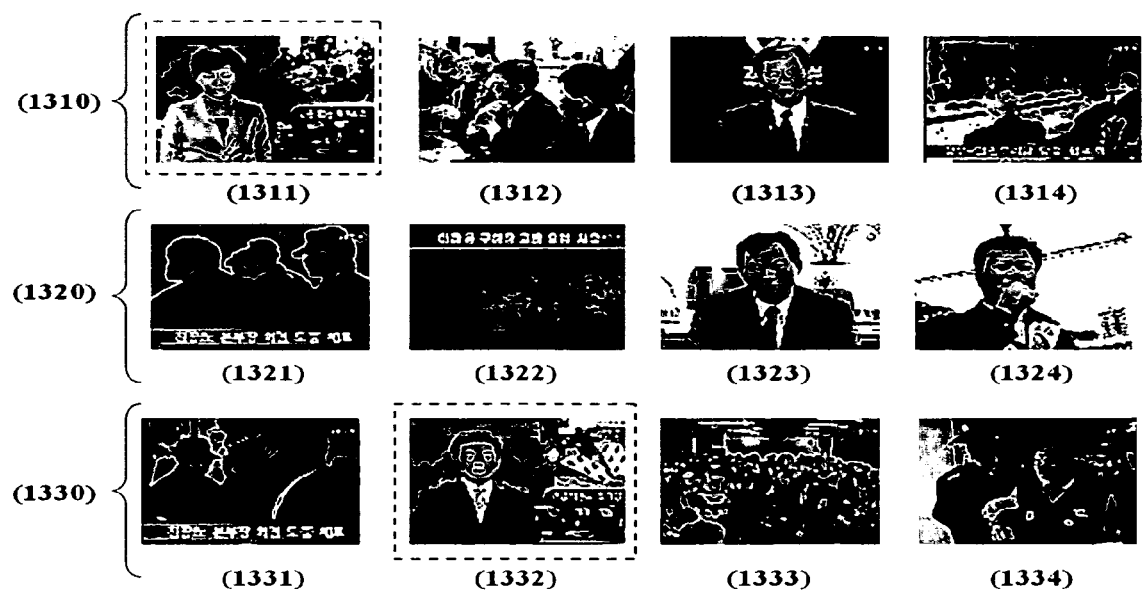
FIG. 13 illustrates an example of a determining of a final event section by an anchor event, according to an embodiment of the present invention.

FIG. 13 illustrates an example of a determining of a final event section by an anchor event, according to an embodiment of the present invention.

Referring to FIG. 13, the first video data 1310 includes an anchor shot 1311 and following shots 1312 through 1314, which are not anchor shots. Accordingly, the first video data 1310 may include video abstract information of the anchor shot 1311.

Second video data 1320, which includes shots 1321-1324, would not include video abstract information since there is no anchor shot.

Third video data 1330 includes shot 1331, an anchor shot 1332, and following shots 1333 and 1334, which are not anchor shots. Thus, third video data 1330 may include video abstract information of the anchor shot 1332.

Figure 14:
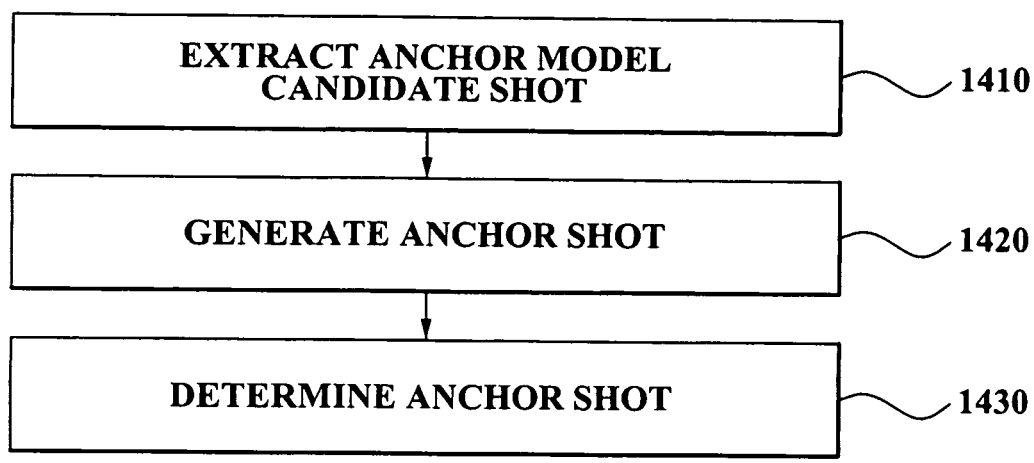
FIG. 14 illustrates a determining of an anchor shot in a news video, according to an embodiment of the present invention.

FIG. 14 illustrates a determining of an anchor shot in the news video, according to an embodiment of the present invention.

Referring to FIG. 14, in operation 1410, an anchor model candidate shot may be extracted. Such an extracting of the anchor model candidate shot will be described in greater detail with reference to FIG. 15.

Figure 15:
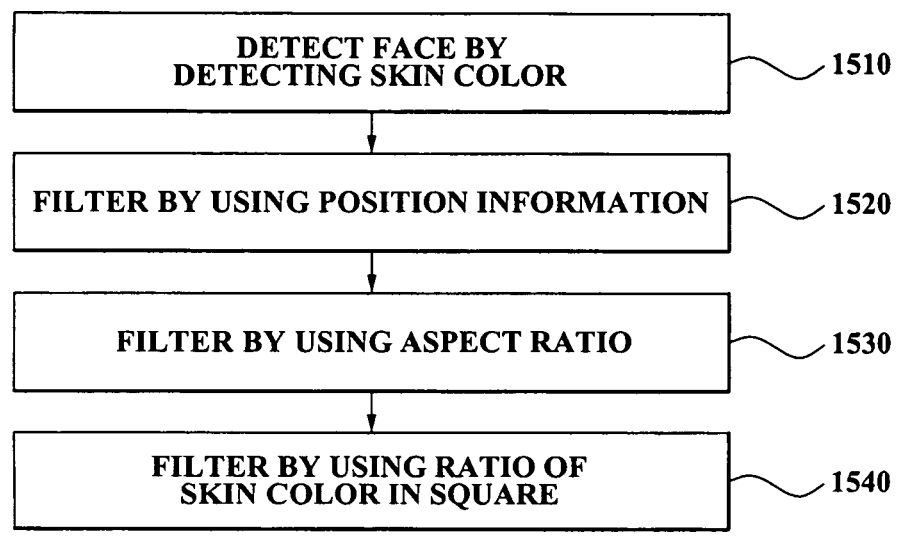
FIG. 15 illustrates an extracting of an anchor model candidate shot from a news video, according to an embodiment of the present invention.

FIG. 15 illustrates an extracting of the anchor model candidate shot from a news video, according to an embodiment of the present invention.

Referring to FIG. 15, in operation 1510, a face may be detected based on detecting skin color.

In operation 1520, position information may be used to filter the detected face.

Further, in operation 1530, an aspect ratio of a square including the face may be used.

Still further, in operation 1540, a ratio of the skin color in the square including the face may be used in the filtering.

In operation 1420, an anchor shot may be generated. Such a generating of an anchor shot will now be described in greater detail with reference to FIG. 16.

Figure 16:
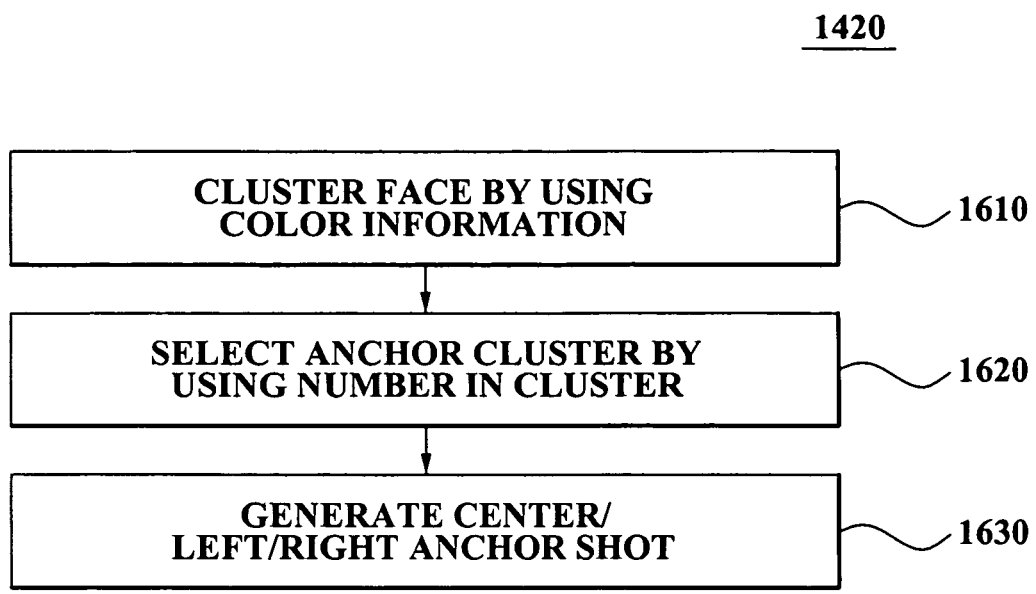
FIG. 16 illustrates a generating of an anchor model, according to an embodiment of the present invention.

FIG. 16 illustrates a generating of an anchor shot, according to an embodiment of the present invention.

Referring to FIG. 16, in operation 1610, the face may be clustered by using color information.

In operation 1620, an anchor cluster may be selected by using a number in a cluster.

Further, in operation 1630, center/left/right anchor model may be generated.

In operation 1430, the anchor shot may be determined by comparing the generated anchor model with a key frame.

As described above, in a high-speed video abstract generation method, according to an embodiment of the present invention, an audio event section may be detected from video data associated with news, based on a silent section of audio information, and a final event section may be detected from the detected audio event section, based on visual information, thereby generating video abstract information.

Figure 17:
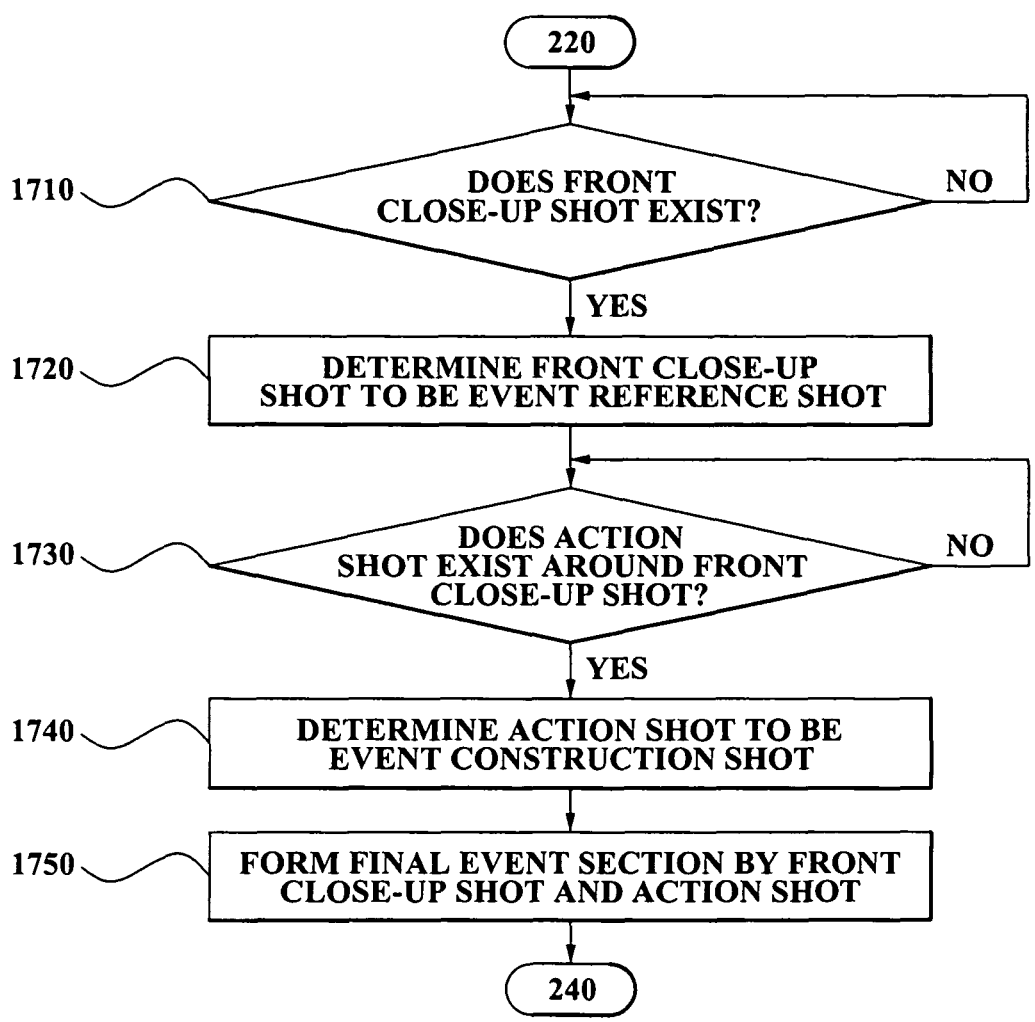
FIG. 17 illustrates a determining of an action event in a movie, according to an embodiment of the present invention.

FIG. 17 illustrates a determining of an action event in a movie, in a high-speed video abstract generation method.

Referring to FIG. 17, in operation 1710, whether there is a front close-up shot may be determined.

When there is a front close-up shot, the front close-up shot may be determined to be an event reference shot, in operation 1720.

In operation 1730, whether there is the action shot around, before and/or after, the front close-up shot may be determined.

When there is the action shot, the action shot may be determined to be an event construction shot, in operation 1740.

In operation 1750, the final event section may be determined to be the close-up shot and the action shot.

Figure 18:
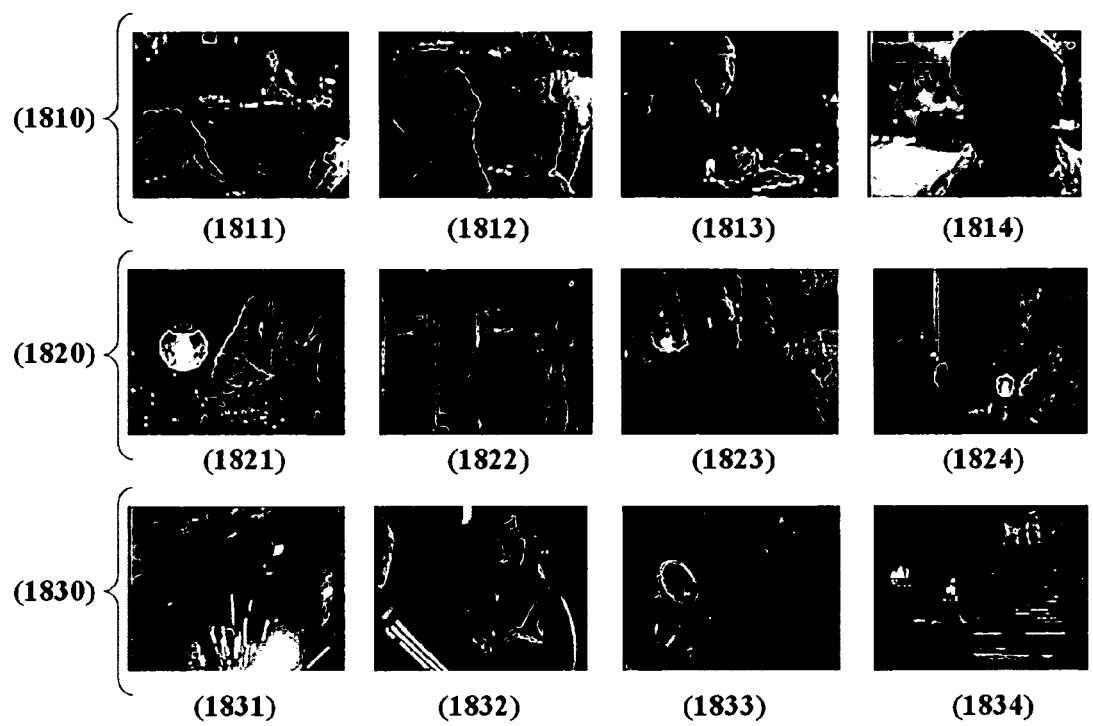
FIG. 18 illustrates an example of an action event in a movie, according to an embodiment of the present invention.

FIG. 18 illustrates an example of an action event in such a movie, according to an embodiment of the present invention.

Referring to FIG. 18, the first video 1810 includes shots 1811-1814, and since there is a front close-up shot 1814 but no action shot before or after the front close-up shot 1814, a final event section is not formed. Therefore, first video data 1810 does not include video abstract information.

Second video 1820 includes shots 1821-1824, and since there is a front close-up shot 1823 but no action shot before or after the front close-up shot 1823, again, a final event section is not formed. Therefore, second video data 1820 does not include video abstract information.

Third video 1830 includes shots 1831-1834, and since there is a front close-up shot 1832 and action shots 1831, 1833, and 1834 before or after the front close-up shot 1832, a final event section may be formed by the front close-up shot 1832 and the action shots 1831, 1833, and 1834. Therefore, third video data 1830 may include video abstract information with respect to the final event section.

Figure 19:
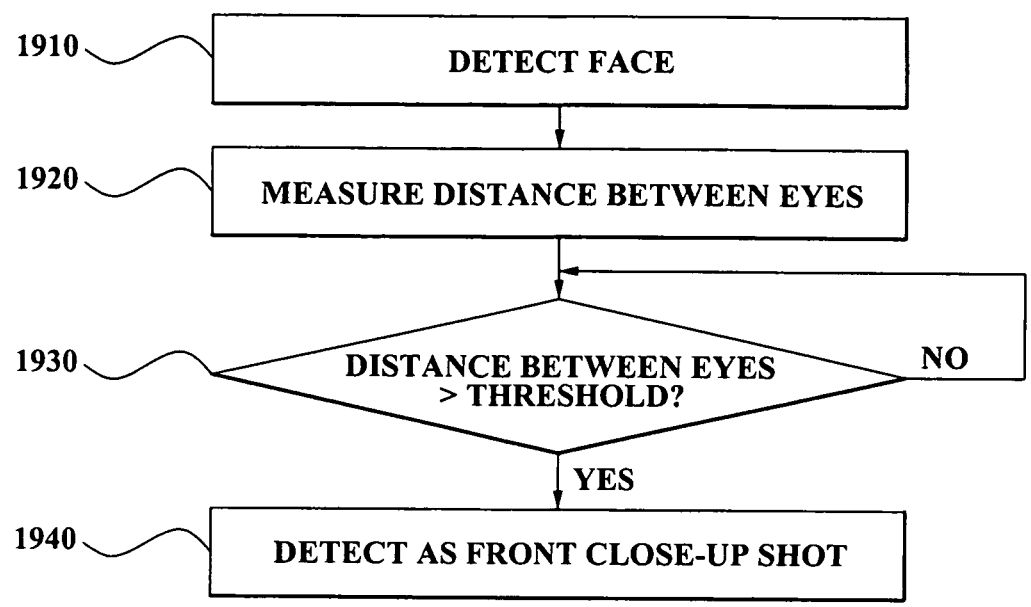
FIG. 19 illustrates a detecting of a front close-up shot from a movie video, according to an embodiment of the present invention.

FIG. 19 illustrates a detecting of a front close-up shot from a movie video, according to an embodiment of the present invention.

Figure 20:
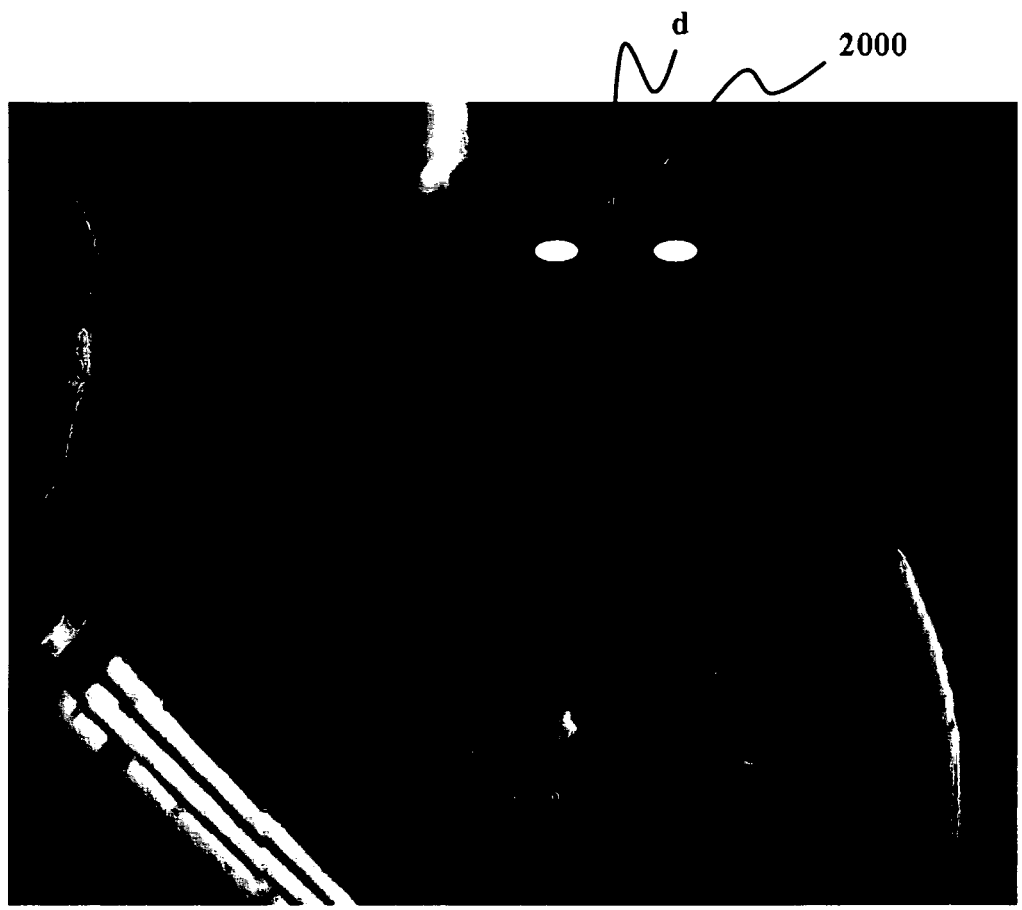
FIG. 20 illustrates an example of a front close-up shot, according to an embodiment of the present invention.

Referring to FIG. 19, in operation 1910, a face area 2000 may be detected from video data shown in FIG. 20.

In operation 1920, a distance d between eyes in the detected face area 2000 may be measured.

Further, in operation 1930, whether the measured distance between the eyes is more than a predetermined threshold may be determined.

When the measured distance between the eyes is more than the threshold, the shot may be detected as being a front close-up shot, in operation 1940.

Figure 21:
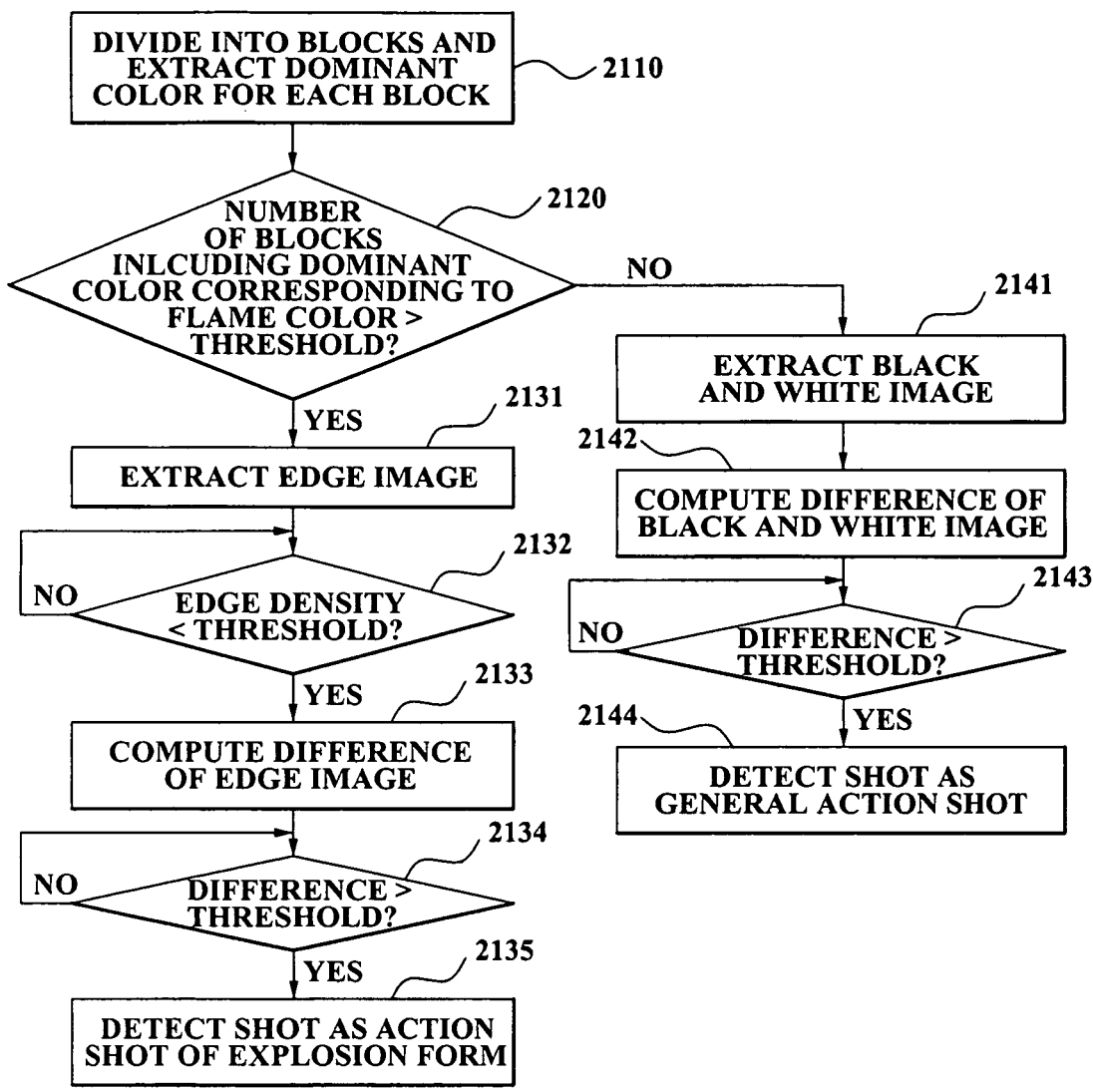
FIG. 21 illustrates a detecting of an action shot from a movie video, according to an embodiment of the present invention.

FIG. 21 illustrates a detecting of an action shot from a movie video, according to an embodiment of the present invention.

Referring to FIG. 21, in operation 2110, a shot of video data may be divided into blocks and a dominant color for each block may be extracted.

In operation 2120, whether a number of blocks including a dominant color corresponding to flames is greater than a predetermined threshold may be determined.

When the number of blocks including the dominant color corresponding to flames is more than the threshold, an edge image may be extracted, in operation 2131.

In operation 2132, whether the density of the extracted edge image is less than a predetermined threshold may be determined.

When the density of the edge image is less than the threshold, a difference of the edge image may be computed, in operation 2133.

In operation 2134, whether the computed difference is greater than the threshold may be determined.

When the difference is more than the threshold, the shot may be detected as an explosion action shot, in operation 2135. In the explosion action shot, a form of the edge is not clear and there are substantial changes along the edge, such as in first shot 2211 and second shot 2212.

On the other hand, when the number of the blocks including the dominant color corresponding to the flames is not more than the threshold, a black and white image may be extracted, in operation 2141.

In operation 2142, a difference of the extracted black and white image may be computed.

In operation 2143, whether the computed difference is greater than a predetermined threshold may be determined.

Figure 22:
FIG. 22 illustrates an example of an action shot, according to an embodiment of the present invention.
Figure 22:
Figure 22:
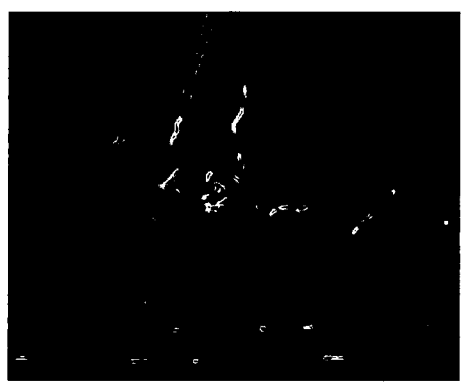
Figure 22:

When the difference is greater than the threshold, the shot may be detected as a general action shot, in operation 2144. In such a general action shot, there are substantial differences in the views, such as between third shot 2213 and the fourth shot 2214 shown in FIG. 22.

As described above, in a high-speed video abstract generation method, according to an embodiment of the present invention, when video data is associated with a movie, an event candidate section according to a music section may be extracted from the video data by using audio information, a front close-up shot and action shot may be extracted as a final event section from the extracted event candidate section by using visual information, and video abstract information may be generated.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion.

According to an embodiment of the present invention, an event section may be extracted by using audio information, and video abstract information of only the detected event section is generated by using visual information, thereby maintaining a level of coherence of an abstract and improving the processing speed in generating the video abstract information. Similarly, the event section may be extracted solely from the audio information. Herein, these references to only the audio information being the basis of the event section and/or only the video abstract information being derived only from the detected event section are not meant to limit the present invention as alternative embodiments that incorporate such inventive aspects are equally available.

Further, according an embodiment of the present invention, in video data associated with a sports game, an audio event section may be detected based on audio information such as cheers, a frequency of reaching a crescendo of an announcer, and/or a sound of a handclap, for example, and a final event section may be detected from the audio event section based on visual information, thereby generating video abstract information.

Still further, according to an embodiment of the present invention, in video data associated with news, an audio event section may be detected based on audio information according to a silent section, for example, and a final event section may be detected from the detected audio event section based on visual information, thereby generating video abstract information.

According to another embodiment of the present invention, in video data associated with a drama or a movie, an audio event section may be detected based on audio information according to a music section, for example, and a final event section may be detected from the detected audio event section based on visual information, thereby generating video abstract information.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of generating a video abstract, comprising:
   detecting, by one or more processors, a first section of video data based on audio information of the video data;
   detecting a second section of the video data based on the first section, the second section being chronologically successive and including the first section;
   detecting third sections, from the detected second section, based on visual information of the video data; and
   generating video abstract information of the video data by using the detected third sections,
   wherein the second section includes a time-wise forward section before the first section and a time-wise back section after the first section, the time-wise forward section has a predetermined time length and the time-wise back section has the predetermined time length.

2. The method of claim 1, wherein, when the video data is associated with a sport game, the first section is determined based on one of cheers, a frequency of reaching a crescendo of an announcer, and a sound of a handclap.

3. The method of claim 1, wherein, when the video data is associated with news, the first section is determined based on a silent section.

4. The method of claim 1, wherein, when the video data is associated with one of a drama and a movie, the first section is determined based on one of a music section and an explosive sound.

5. The method of claim 1, wherein the detecting of the third sections comprises:
   detecting an event reference shot from the second section;
   detecting an event construction shot time-wise adjacent to the detected event reference shot; and
   determining a third event section based on the detected event construction shot.

6. The method of claim 5, wherein, when the video data is associated with a soccer game, the event reference shot is a penalty area shot.

7. The method of claim 6, wherein the detecting of the event reference shot comprises:
   dividing a frame into N×N blocks and determining a first critical value with respect to a detected pixel value for each block;
   allocating 255 to a pixel value for each respective block when the respective detected pixel value is greater than the first critical value;
   allocating 0 to a pixel value for each respective block when the respective detected pixel value not greater than the first critical value:
   substituting a position of a pixel whose allocated value is 255 through a predetermined equation and computing a position having a largest number of the pixels;
   determining whether the computed position is corresponding to an incline and a distance of a penalty line when the largest number of the pixels is greater than a second critical value; and
   detecting the event reference shot to be the penalty area shot when the computed position is corresponding to the incline and the distance of the penalty line.

8. The method of claim 6, wherein the detecting of the event construction shot time-wise adjacent to the detected event reference shot comprises:
   determining whether, in a following shot after the penalty area shot, a number of close-up shots is greater than a predetermined number; and
   determining the close-up shots to be event construction shots when the number of close-up shots is greater than the predetermined number.

9. The method of claim 8, wherein, when the video data is associated with the soccer game, in the determining of the third section, the penalty area shot and the close-up shots are determined to be part of the third section.

10. The method of claim 5, wherein, when the video data is associated with news, the event reference shot is an anchor shot.

11. The method of claim 10, wherein the detecting of the event reference shot comprises:
    extracting an anchor model candidate shot;
    generating an anchor model from the extracted anchor model candidate shot; and
    determining the event reference shot to be the anchor shot by comparing the generated anchor model with a key frame.

12. The method of claim 5, wherein, when the video data is associated with a movie, the event reference shot is a front close-up shot, and the event construction shot is an action shot.

13. The method of claim 12, wherein the detecting of the event reference shot comprises:
    detecting a face from a shot of the video data;
    measuring a distance between eyes of the detected face; and
    determining the event reference shot to be the front close-up shot when the measured distance between the eyes is greater than a critical value.

14. The method of claim 1, wherein the detecting of the second section in the video data is based only on the corresponding audio information.

15. The method of claim 1, wherein the generating of the video abstract information is based only on third sections that are derived from the detected second sections based on the audio information.

16. A non-transitory medium comprising computer readable code to implement the method of claim 1.

17. An apparatus, comprising:
    a section detection unit to detect a first section of video data based on audio information of the video data, to detect a second section of the video data based on the first section, the second section being chronologically successive and including the first section, and to detect third sections, from the detected second section, based on visual information of the video data; and a video abstract information generation unit to generate video abstract information of the video data by using the detected third sections, wherein the second section includes a time-wise forward section before the first section and a time-wise back section after the first segment, the time-wise forward section has a predetermined time length and the time-wise back section has the predetermined time length.

18. The method of claim 1, wherein the second section includes at least one of a time-wise forward section immediately before the first section and a time-wise back section immediately after the first segment.

19. The method of claim 1, a start time of the second section is earlier than a start time of the first section, and a finish time of the second section is later than a finish time of the first section.

* * * * *